United States Patent
Song et al.

(10) Patent No.: US 11,869,709 B2
(45) Date of Patent: Jan. 9, 2024

(54) SUPERCONDUCTING MAGNET SYSTEM AND QUENCH PROTECTION CIRCUIT THEREOF

(71) Applicant: HUAZHONG UNIVERSITY OF SCIENCE AND TECHNOLOGY, Hubei (CN)

(72) Inventors: Yunxing Song, Hubei (CN); Liang Li, Hubei (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 192 days.

(21) Appl. No.: 17/622,864

(22) PCT Filed: Apr. 25, 2021

(86) PCT No.: PCT/CN2021/089599
§ 371 (c)(1),
(2) Date: Dec. 27, 2021

(87) PCT Pub. No.: WO2022/166004
PCT Pub. Date: Aug. 11, 2022

(65) Prior Publication Data
US 2023/0137679 A1    May 4, 2023

(30) Foreign Application Priority Data
Feb. 5, 2021 (CN) .................. 202110163248.X (51) Int. Cl.
*H02H 7/00* (2006.01)
*H01F 6/02* (2006.01)
(Continued)

(52) U.S. Cl.
CPC .................. *H01F 6/02* (2013.01); *H01F 6/06* (2013.01); *H02H 7/001* (2013.01); *H01F 6/04* (2013.01)

(58) Field of Classification Search
CPC ............ H02H 9/023; H02H 9/00; H02H 9/02; H02H 9/041; H02H 7/001; H01F 6/02;
(Continued)

(56) References Cited

U.S. PATENT DOCUMENTS

2012/0071326 A1* 3/2012 Wu .......................... H01F 6/02
505/211

FOREIGN PATENT DOCUMENTS

| CN | 102214911 | 10/2011 |
| CN | 110571011 | 12/2019 |

OTHER PUBLICATIONS

"International Search Report (Form PCT/ISA/210) of PCT/CN2021/089599," dated Nov. 4, 2021, pp. 1-4.
(Continued)

*Primary Examiner* — Bryan R Perez
(74) *Attorney, Agent, or Firm* — JCIP GLOBAL INC.

(57) ABSTRACT

The disclosure discloses a superconducting magnet system and a quench protection circuit thereof. The quench protection circuit includes: a superconducting unit, a first diode integrated element, a second diode integrated element, a third diode integrated element, a low-temperature superconducting switch, a thermal shield and a vacuum vessel. The superconducting unit is composed of M superconducting coils connected in series. The low-temperature superconducting switch is connected to the first superconducting coil and the M-th superconducting coil. The first diode integrated element is connected in parallel with the low-temperature superconducting switch; the thermal shield and the second diode integrated element are connected in series and then
(Continued)

connected in parallel at both ends of any symmetrical coil subsets in the superconducting unit. The vacuum vessel and the third diode integrated element are connected in series and then connected in parallel at both ends of any symmetrical coil subset of the superconducting unit.

20 Claims, 4 Drawing Sheets (51) Int. Cl.
*H01F 6/06* (2006.01)
*H01F 6/04* (2006.01)

(58) Field of Classification Search
CPC ... H01F 6/06; H01F 6/04; H01F 6/008; H01F 6/003
See application file for complete search history.

(56) References Cited

OTHER PUBLICATIONS

"Written Opinion of the International Searching Authority (Form PCT/ISA/237) of PCT/CN2021/089599," dated Nov. 4, 2021, pp. 1-5.

\* cited by examiner

SUPERCONDUCTING MAGNET SYSTEM AND QUENCH PROTECTION CIRCUIT THEREOF

CROSS-REFERENCE TO RELATED APPLICATION

This application is a 371 of international application of PCT application serial no. PCT/CN2021/089599, filed on Apr. 25, 2021, which claims the priority benefit of China application no. 202110163248.X, filed on Feb. 5, 2021. The entirety of each of the above mentioned patent applications is hereby incorporated by reference herein and made a part of this specification.

FIELD OF THE DISCLOSURE

The disclosure belongs to the technical field of superconducting magnets, and more specifically, relates to a superconducting magnet system and a quench protection circuit thereof.

DESCRIPTION OF RELATED ART

As it is commonly known, superconducting magnet systems are widely used in basic scientific research, medical and health, transportation, defense industry, electrical engineering and other fields. In particular, superconducting magnet systems are widely used in the fields of NMR (Nuclear Magnetic Resonance) and MRI (Magnetic Resonance Imaging). However, superconducting magnets need to be kept in a suitable low-temperature environment (for example, 4.2K) to realize superconductivity.

Figure 1:
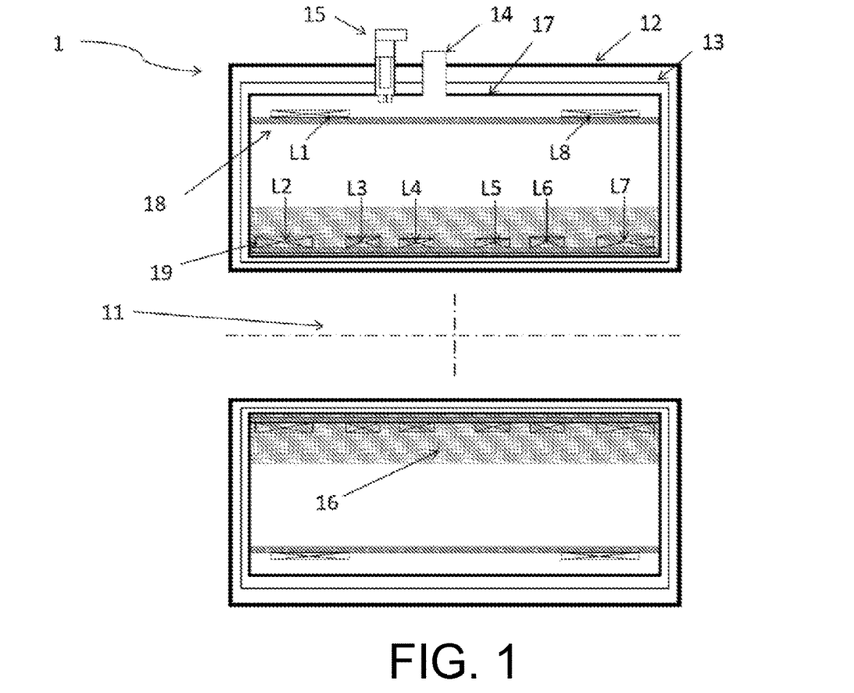
FIG. 1 is a schematic view of a liquid helium immersed superconducting magnet system provided by conventional technology.

Currently, there are three different types of superconducting magnet systems: FIG. 1 shows a superconducting magnet system immersed in liquid helium. The superconducting magnet system 1 includes: a superconducting coil 19, and the superconducting coil 19 is supported by a magnet former 18, and they are assembled together in a cryogenic container 17. The liquid helium 16 is fed into the cryogenic container 17 through a magnet console 14, and the temperature of the cryogenic container 17 is maintained at about 4.2K. In order to reduce the radiant heat, the cryogenic container 17 is covered with a coaxial thermal shield 13, and the thermal shield 13 is covered with a coaxial vacuum vessel 12. The center of the vacuum vessel 12 forms a field of view (FOV) 11. In order to maintain the zero boil off and stable radiant heat of liquid helium, the secondary cold head of a refrigerator 15 is thermally connected to the cryogenic container 17, and the primary cold head is thermally connected to the thermal shield 13. The temperature of the thermal shield 13 is maintained at ~50K.

Figure 2:
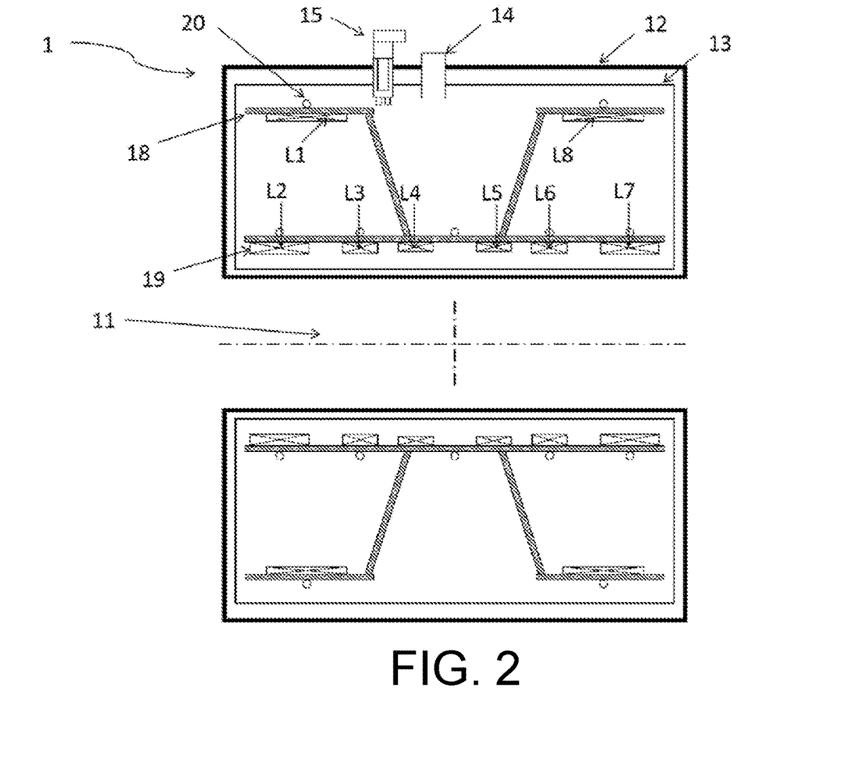
FIG. 2 is a schematic view of a little-liquid helium conduction cooling superconducting magnet system provided by conventional technology.

FIG. 2 shows a little-liquid helium conduction cooling magnet system. Compared with FIG. 1, the cryogenic container 17 is removed but a thermosiphon cooling tube 20 is added. The liquid helium and gas helium are in the thermosiphon cooling tube 20, combined with the refrigerator 15 to achieve closed-loop cooling.

Figure 3:
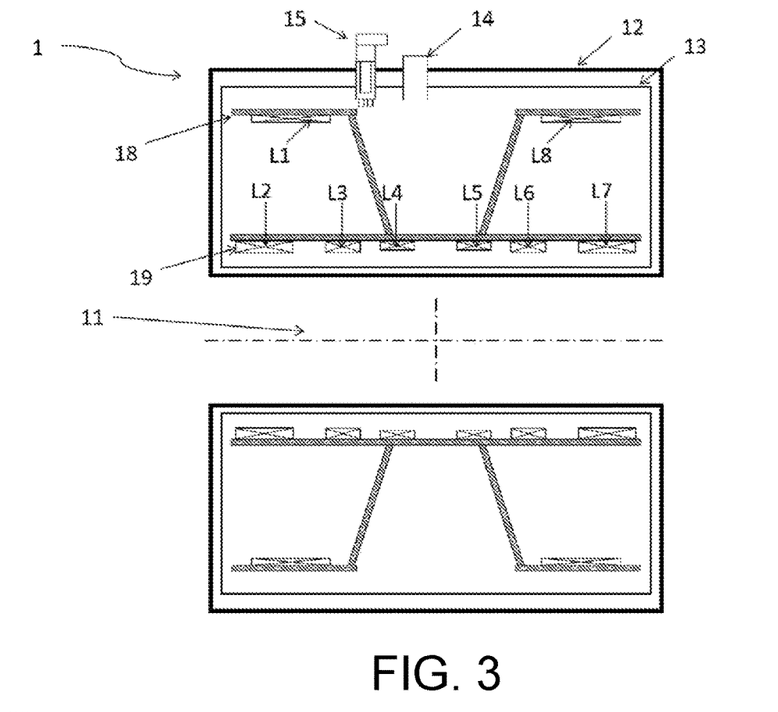
FIG. 3 is a schematic view of a pure conduction cooling superconducting magnet system provided by conventional technology.

FIG. 3 shows a pure conduction cooling magnet system. Compared with FIG. 2, the thermosiphon cooling tube 20 is removed. The cooling of the superconducting magnet system 1 completely relies on the direct conduction cooling of the refrigerator 15.

During normal ramp-up, ramp-down, or steady-state operation, the superconducting magnet is in a superconducting state, that is, a state with zero resistance. However, once there is local thermal disturbances, the superconducting magnet will have a local normal zone, so that the magnetic energy stored in the superconducting magnet will be converted into thermal energy, which will lead to the propagation of the normal zone and the decaying of the current flowing through the superconducting magnet, which will eventually cause the entire magnet to quench.

During the quench process, if there is no proper protection procedure, the thermal energy will be deposited locally, which can cause problems such as overheating and over-voltage of the superconducting magnet, large amount of liquid helium boil-off, and excessive re-cooling time for the superconducting magnet. For example, (1) For the superconducting magnet system immersed in liquid helium as shown in FIG. 1, the quench of the superconducting magnet will cause a large amount of liquid helium to volatilize. However, due to the limited and non-renewable storage of helium resources on the earth, its price keeps rising. If it is possible to reduce the boil-off of liquid helium during the quench process, the operating cost of the superconducting magnet system will be significantly reduced. (2) For the little-liquid helium conduction cooling superconducting magnet system shown in FIG. 2 or the pure conduction cooling superconducting magnet system shown in FIG. 3, the quench of the superconducting magnet will cause a sharp rise in the temperature of the coil, which makes the re-cooling time of the superconducting magnet increase. If most of the magnetic energy of the superconducting coil can be transferred to the outside of the superconducting coil during the quench process, the temperature increasing of the superconducting coil will be considerably reduced, thereby reducing the re-cooling time of the superconducting magnet.

A commonly known quench protection method is provided in conventional technologies. The method uses a set of heaters pasted on the surface of each superconducting coil to accelerate the quenched superconducting coil and trigger the superconducting coil that has not yet quenched to quench, so that as many superconducting coils as possible quench over a large area simultaneously. In this manner, it is possible to avoid overheating and over-voltage of the superconducting coils and achieve the purpose of protecting the superconducting magnets. The disadvantage of this method is that all the magnetic energy is converted into thermal energy within the thermal shield 13. For the liquid helium immersed superconducting magnet system shown in FIG. 1, all the thermal energy is absorbed by the superconducting magnet and liquid helium, resulting in boil-off of a large amount of liquid helium. For the little-liquid helium conduction cooling magnet system shown in FIG. 2 or the pure conduction cooling magnet system shown in FIG. 3, all the thermal energy is absorbed by the superconducting magnet, causing the re-cooling time of the superconducting magnet to be excessively long.

SUMMARY OF THE DISCLOSURE

Aiming at the defects of the prior art, the purpose of the present invention is to provide a superconducting magnet system and its quench protection circuit to solve the quench protection method in the prior art which allows as many superconducting coils as possible to quench over a large area at the same time resulting in boil-off of a large amount of helium or the superconducting magnet's re-cooling time is too long.

The disclosure provides a quench protection circuit, which includes a superconducting unit, a first diode integrated element, a low-temperature superconducting switch and a thermal shield. The superconducting unit is composed of M superconducting coils connected in series, which are sequentially denoted as a first superconducting coil, a second superconducting coil . . . an (M−1)th superconducting coil and an M-th superconducting coil. The non-serial connection end of the first superconducting coil and the non-serial connection end of the M-th superconducting coil are respectively connected to the current leads, and the current leads are connected to an excitation power supply. One end of the low-temperature superconducting switch is connected to the non-serial connection end of the first superconducting coil, and the other end of the low-temperature superconducting switch is connected to the non-serial connection end of the M-th superconducting coil. The first diode integrated element is connected in parallel with the low-temperature superconducting switch to protect the superconducting switch. The thermal shield is connected in parallel to both ends of any superconducting coil subset that are spatially symmetric in the superconducting unit. The thermal shield is used to transfer the magnetic energy in the superconducting coil during the quench process. The superconducting coil subset is composed of one superconducting coil or multiple superconducting coils, or composed of one superconducting sub-coil or composed of a superconducting sub-coil and a superconducting coil. The superconducting sub-coil is a part of the superconducting coil.

The disclosure utilizes circuit connection to transfer the magnetic energy to the thermal shield and the vacuum vessel, thereby protecting the superconducting magnet system from damage during quench and reducing the cooling time and liquid helium boil-off of the superconducting magnet.

In the embodiment of the disclosure, the number of M can be set as required. When M is 8, the current direction in the first superconducting coil and the M-th superconducting coil can be set to be opposite to the current direction in other superconducting coils.

In an embodiment of the disclosure, one end of the thermal shield is connected to a connection end where the second superconducting coil is connected to the third superconducting coil, and the other end of the thermal shield is connected to a connection end where the sixth superconducting coil is connected to the seventh superconducting coil.

In another embodiment of the disclosure, one end of the thermal shield is connected to a position X1, and the other end is connected to a position X2. The position X1 is set at any position in any superconducting coil, and the position X2 is set at a position that is spatially symmetrical to the position X1.

In an embodiment of the disclosure, the quench protection circuit further includes a second diode integrated element, which is connected in series with the thermal shield, and is used to, prevent the thermal shield from conducting electricity and prevent the thermal shield from being heated and resulting in increased radiant heat and even quench of the superconducting magnet when the superconducting magnet is in the ramp-up or ramp-down mode.

Further, the threshold voltage of the second diode integrated element is greater than the maximum voltage at both ends of the coil subset connected in parallel with the second diode integrated element in the ramp-up or ramp-down mode.

In an embodiment of the disclosure, the quench protection circuit further includes a vacuum vessel, which is connected in parallel with the thermal shield. The vacuum vessel is used to further transfer the magnetic energy of the superconducting magnet during the quench process.

In another embodiment of the disclosure, the quench protection circuit further includes a vacuum vessel and a third diode integrated element. The vacuum vessel and the third diode integrated element are connected in series and connected to both ends of any coil subset that are spatially symmetrical in the superconducting unit.

Furthermore, the vacuum vessel and the third diode integrated element are connected in series and connected between the connection end of the first superconducting coil L1 and the second superconducting coil L2 and the connection end of the (M−1)th superconducting coil and the M-th superconducting coil.

Furthermore, the vacuum vessel and the third diode integrated element are connected in series and connected between the connection end of the second superconducting coil L2 and the third superconducting coil L3 and the connection end of the (M−2)th superconducting coil and the (M−1)th superconducting coil.

The disclosure further provides a superconducting magnet system including the quench protection circuit.

Through the above technical solutions conceived by the disclosure, compared with the conventional technology, since the magnetic energy is effectively transferred to the thermal shield and the vacuum vessel outside the superconducting coil, it is possible to achieve the advantageous effect of protecting the superconducting coil from damage during quench, reducing the cooling time of superconducting magnets and the loss of liquid helium.

1 represents a superconducting magnet system, 11 represents afield of view (FOV), 12 represents a vacuum vessel (VV), 13 represents a thermal shield (TS), 14 represents a magnet console, 15 represents a refrigerator, 16 represents liquid helium, 17 represents a cryogenic container (HV), 18 represents a magnet former, 19 represents a superconducting coil, 20 represents a thermosiphon cooling tube, 100 represents a quench protection circuit, 101 represents a superconducting unit, 102 represents a first diode integrated element, 103 represents a low-temperature superconducting switch, 104 represents a current lead, 105 represents a thermal shield, 106 represents a second diode integrated element, 107 represents a vacuum vessel, 108 represents a third diode integrated element.

DESCRIPTION OF EMBODIMENTS

In order to make the purpose, technical solutions, and advantages of the disclosure clearer, the following further describes the disclosure in detail with reference to the accompanying drawings and embodiments. It should be understood that the specific embodiments described here are only used to explain the disclosure, but not to limit the disclosure.

One or more aspects of the disclosure are now summarized in order to facilitate the basic understanding of the disclosure. The summary is not an expansive overview of the disclosure, and is not intended to identify certain elements of the disclosure, nor is it intended to limit the scope of the disclosure. On the contrary, the main purpose of this summary is to present some concepts of the disclosure in a simplified form before presenting a more detailed description below.

Figure 4:
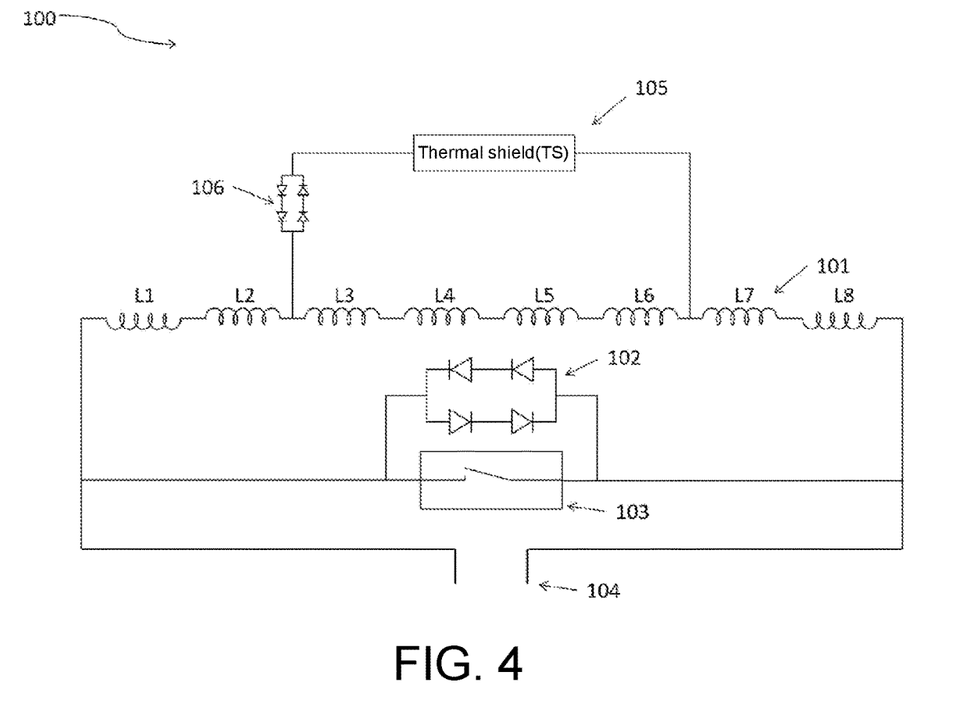
FIG. 4 is a schematic view of a quench protection circuit of a superconducting magnet system provided by the first embodiment of the disclosure.

The disclosure provides a quench protection circuit that uses a thermal shield and a vacuum vessel to protect the superconducting magnet system from damage during the quench, and reduce the re-cooling time of the superconducting magnet and the loss of liquid helium. As shown in FIG. 4, the quench protection circuit 100 includes: a superconducting unit 101, a first diode integrated element 102, a low-temperature superconducting switch 103, and a thermal shield 105. The superconducting unit 101 is composed of M superconducting coils connected in series, and the superconducting coils are sequentially denoted as a first superconducting coil, a second superconducting coil . . . the (M−1)th superconducting coil and the M-th superconducting coil. The non-serial connection end of the first superconducting coil and the non-serial connection end of the M-th superconducting coil are respectively connected to both ends of the current leads, and configured to be connected to an excitation power supply. One end of the low-temperature superconducting switch 103 is connected to the non-serial connection end of the first superconducting coil, and the other end of the low-temperature superconducting switch 103 is connected to the non-serial connection end of the M-th superconducting coil. The first diode integrated element 102 is connected in parallel with the low-temperature superconducting switch 103 to protect the superconducting switch 103. The thermal shield 105 is connected in parallel to both ends of a superconducting coil subset that are spatially symmetric in the superconducting unit 101. The thermal shield 105 is used to transfer the magnetic energy in the superconducting coil during the quench process. The superconducting coil subset is composed of one superconducting coil or multiple superconducting coils, or composed of one superconducting sub-coil or composed of a superconducting sub-coil and a superconducting coil. The superconducting sub-coil is a part of the superconducting coil.

In the embodiment of the disclosure, the number M of superconducting coils can be selected as required. In this example, M is set to 8, and in other embodiments, M can also be set as other values. When M is 8, the superconducting coil subsets L1 and L8 are active shield coils, and their current directions may be set to be opposite to the current directions of the superconducting coil subsets L2~L7.

The threshold voltage of the first diode integrated element 102 can be set higher than the maximum excitation voltage at both ends of the superconducting magnet to protect the low-temperature superconducting switch 103.

In an embodiment of the disclosure, the thermal shield 105 and the second diode integrated element 106 are connected in series, and this serially-connected device is connected in parallel with the superconducting coil subsets L3~L6.

Depending on requirements of design, the voltage of the thermal shield 105 can be selected from the voltage between any symmetrical coils, and even one or more symmetrically arranged coils can be divided into several symmetrical sub-coils, the voltage of the thermal shield 105 can be selected from the voltage between any symmetrical coils including the sub-coil. However, the voltage cannot be selected from the voltage between the low-temperature superconducting switches 103.

Figure 6:
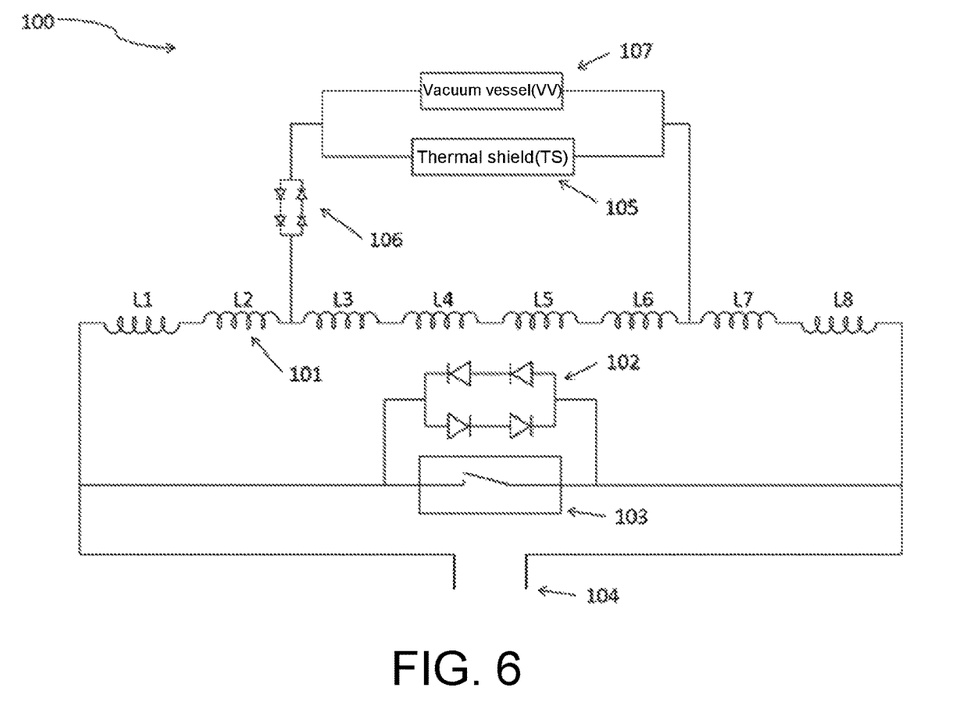
FIG. 6 is a schematic view of a quench protection circuit of a superconducting magnet system provided by the third embodiment of the disclosure.

In another embodiment, the thermal shield 105 and the vacuum vessel 107 are connected in parallel. The parallel-connected device and the second diode integrated element 106 are connected in series, and this serially-connected device is connected in parallel with the superconducting coil subsets L3 to L6. Depending on the needs of design, the voltage can be selected from the voltage between any symmetrical coils, and even one or more symmetrically arranged coils can be divided into several symmetrical sub-coils, the voltage can be selected from the voltage between any symmetrical coils including the sub-coils. However, the voltage cannot be selected from the voltage between the low-temperature superconducting switches 103.

Figure 7:
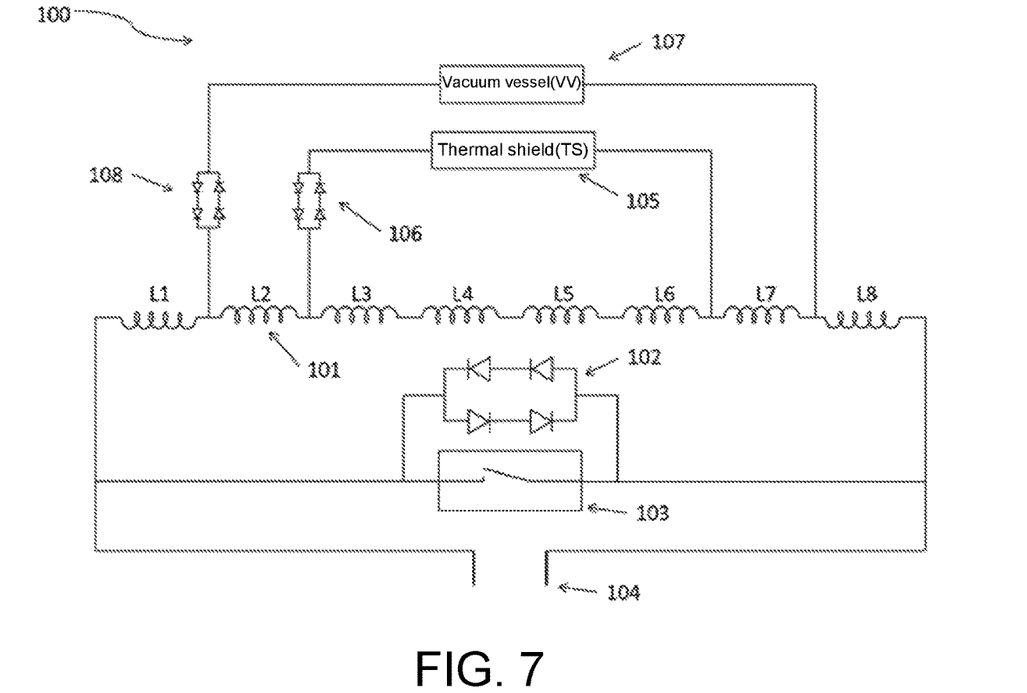
FIG. 7 is a schematic view of a quench protection circuit of a superconducting magnet system provided by the fourth embodiment of the disclosure.

In another embodiment, the thermal shield 105 and the second diode integrated element 106 are connected in series. The serial-connected device and the superconducting coil subsets L3~L6 are connected in parallel. The vacuum vessel 107 and the third diode integrated element 108 are connected in series, and this serial-connected device is connected in parallel with the superconducting coil subsets L2~L7. Depending on the needs of design, the voltage can be selected from the voltage between any symmetrical coils, and even one or more symmetrically arranged coils can be divided into several symmetrical sub-coils, the voltage can be selected from the voltage between any symmetrical coils including the sub-coils. It is even possible to exchange these two branches and then connect them into the circuit. However, the voltage cannot be selected from the voltage between the low-temperature superconducting switches 103.

In order to further illustrate the superconducting magnet system and the quench protection circuit thereof provided by the embodiments of the disclosure, the details are as follows with reference to the drawings and specific examples.

Please refer to FIG. 4, the quench protection circuit 100 includes a superconducting unit 101. The superconducting unit 101 is composed of 8 superconducting coils connected in series, which are denoted as L1~L8. The superconducting coil subsets L1 and L8 are active shield coils, and their current direction is opposite to the current direction of the superconducting coil subsets L2~L7. The quench protection circuit 100 further includes a pair of current leads 104 for connection with an excitation power supply (not shown). The low-temperature superconducting switch 103 and the current lead 104 are connected in parallel. The first diode integrated element 102 and the low-temperature superconducting switch 103 are connected in parallel. The threshold voltage of the first diode integrated element 102 is higher than the maximum excitation voltage at both ends of the superconducting magnet, and is used to protect the low-temperature superconducting switch 103. The thermal shield 105 and the second diode integrated element 106 are connected in series, and this serially-connected device is connected in parallel with the superconducting coil subsets L3 to L6. When the magnet is in the ramp-up or ramp-down mode, the second diode integrated element 106 prevents the thermal shield 105 from conducting electricity and prevents the thermal shield from being heated. The threshold voltage of the second diode integrated element 106 is selected to be greater than the maximum voltage at both ends of the superconducting coil subsets L3 to L6 in the ramp-up or ramp-down mode. Each of the first diode integrated element 102 and the second diode integrated element 106 is typically composed of two sets of two or more diodes connected in series and then connected in inverse-parallel.

In the ramp-up mode, the low-temperature superconducting switch 103 is heated by a heater (not shown). The low-temperature superconducting switch 103 operates as a large-value resistor. When most of the current flows through the superconducting unit 101, the excitation power supply charges the superconducting unit 101. When the magnetic field in the field of view area of the superconducting magnet system reaches the target magnetic field, the power supplied to heat the heater of the low-temperature superconducting switch 103 is turned off, and the low-temperature superconducting switch 103 returns to the superconducting state. In the meantime, the voltage of the excitation power supply is adjusted to 0, and the current lead 104 is removed to limit the heat loss input into the superconducting magnet system, and the superconducting magnet system enters the persistent mode.

In the ramp-down mode, the low-temperature superconducting switch 103 is heated by a heater (not shown). The low-temperature superconducting switch 103 operates as a large-value resistor, and most of the current flows through the superconducting unit 101, the current lead 104, and the excitation power supply. The excitation power supply outputs a reverse voltage to achieve discharge. Sometimes in order to accelerate the discharge, a DC load or diode is connected in series with the excitation power circuit to establish a greater voltage drop. When the current on the power dial shows 0, the excitation power supply can be turned off and the current lead 104 can be removed.

The principle of quench protection circuit is explained below. If the superconducting coil L4 quenches, a voltage will be quickly established at both ends of the coil subsets L3~L6. When the voltage exceeds the threshold voltage of the second diode integrated element 106, a large part of the current will flow through the thermal shield 105, so that the current flowing through the quench coil L4 and the Joule heat generated due to the quench are considerably reduced. In this manner, the temperature of hot spot of the superconducting coil L4 is controlled at a low level. The final results are shown in: (1) For the superconducting magnet system immersed in liquid helium as shown in FIG. 1, since most of the magnetic energy of the superconducting unit 101 is transferred to the thermal shield, the energy of the superconducting unit 101 being converted into heat energy decreases, thereby reducing the boil-off of liquid helium. (2) For the little-liquid helium conduction cooling magnet system (FIG. 2) or the pure conduction cooling magnet system (FIG. 3), most of the magnetic energy of the superconducting unit 101 is transferred to the outside of the superconducting unit 101, which significantly reduces the temperature of the superconducting unit 101. Therefore, the re-cooling time of the superconducting magnet system is shortened.

Figure 5:
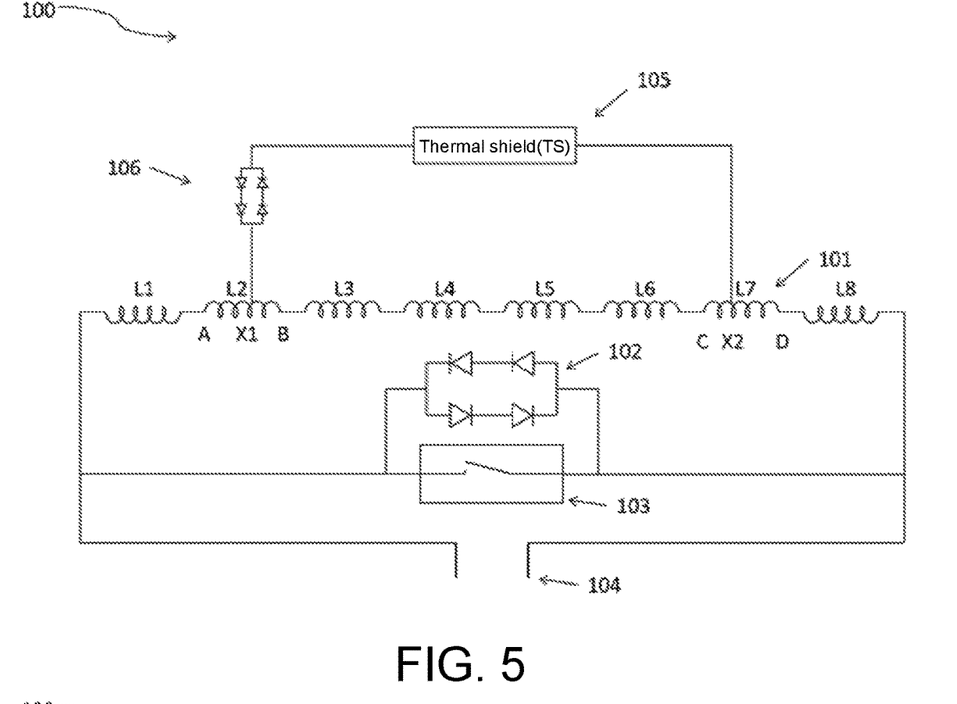
FIG. 5 is a schematic view of a quench protection circuit of a superconducting magnet system provided by the second embodiment of the disclosure.

Please keep referring to FIG. 4, the voltage of the thermal shield 105 is taken from the coil subsets L3 to L6, which is just an example. Depending on the needs of the design, the voltage of the thermal shield 105 can be selected from the voltage at both ends of any symmetrical coil, and even one or more symmetrically arranged coils can be divided into several symmetrical sub-coils., the voltage of the thermal shield 105 can be selected from the voltage at both ends of any symmetrical coil including the sub-coil. FIG. 5 is an example. The voltage of the thermal shield 105 is taken from the position between position X1 and position X2 that are spatially symmetrical, and the position X1 is set anywhere in any superconducting coil. The position X2 is set at a position that is spatially symmetrical with the position X1. However, the voltage of the thermal shield 105 cannot be taken from the voltage between the low-temperature superconducting switches 103.

Please refer to FIG. 6, which is a circuit diagram of a quench protection circuit according to another embodiment of the disclosure. The thermal shield 105 and the vacuum vessel 107 are connected in parallel, the parallel-connected device and the second diode integrated element 106 are connected in series, and this serial-connected device is connected in parallel with the superconducting coil subsets L3 to L6. When the magnet is in the ramp-up or ramp-down mode, the second diode integrated element 106 prevents the thermal shield 105 and the vacuum vessel 107 from conducting electricity, thereby preventing them from generating heat. The threshold voltage of the second diode integrated element 106 is selected to be greater than the maximum voltage at both ends of the superconducting coil subsets L3 to L6 in the ramp-up or ramp-down mode. The operating principle of this circuit is similar to FIG. 4, and the difference lies in the addition of a vacuum vessel circuit loop. When quench occurs, the magnetic energy is not only transferred to the thermal shield, but also transferred to the vacuum vessel, thereby further reducing the increase of temperature of the superconducting magnet.

Please further refer to FIG. 6, the voltages of the thermal shield 105 and the vacuum vessel 107 are taken from the coil subsets L3 to L6, which is just an example. Depending on the needs of the design, the voltage can be taken from the voltage at both ends of any symmetrical coil, and even one or more symmetrically arranged coils can be divided into several symmetrical sub-coils, the voltage can be taken from the voltage at both ends of any symmetrical coil including the sub-coil. However, the voltage cannot be taken from the voltage between the low-temperature superconducting switches 103.

Please refer to FIG. 7, which is a circuit diagram of a quench protection circuit according to another embodiment of the disclosure. The thermal shield 105 and the second diode integrated element 106 are connected in series, and this serially-connected device is connected in parallel with the superconducting coil subsets L3 to L6. The vacuum vessel 107 and the third diode integrated element 108 are connected in series, and this serially-connected device is connected in parallel with the superconducting coil subsets L2~L7. When the superconducting magnet is in the ramp-up or ramp-down mode, the second diode integrated element 106 prevents the thermal shield 105 from conducting electricity, and the third diode integrated element 108 prevents the vacuum vessel 107 from conducting electricity, thereby preventing the thermal shield and the vacuum vessel from generating heat. The threshold voltage of the diode integrated elements 106 and 108 is selected to be greater than the maximum voltage at both ends of the superconducting coil subsets L3~L6 and L2~L7 in the ramp-up or ramp-down mode.

Figure 8:
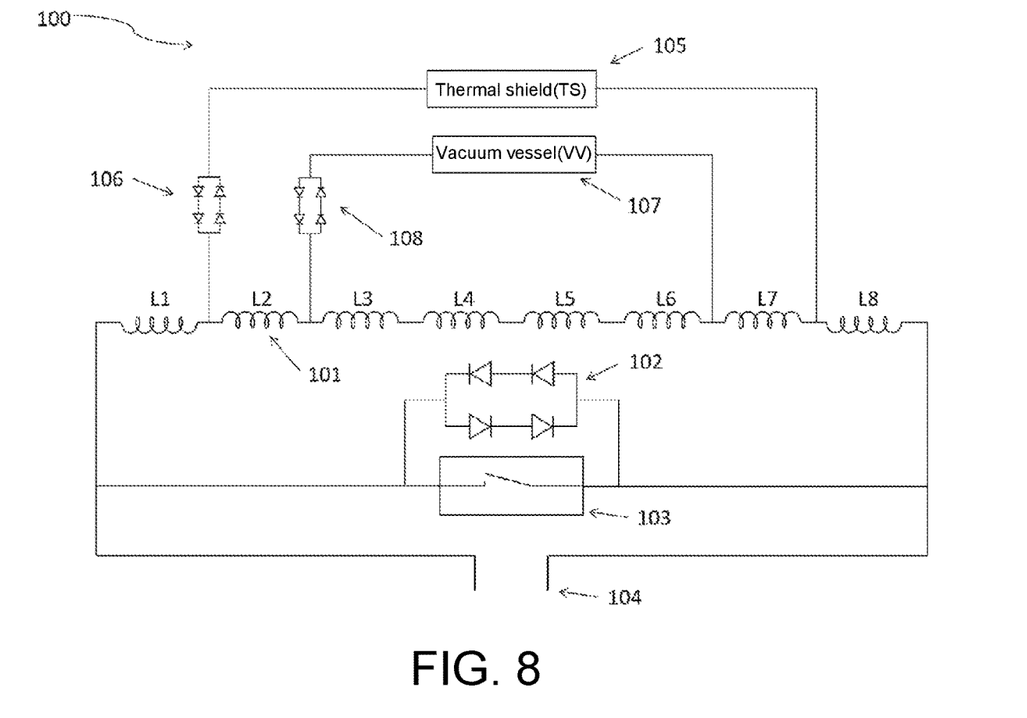
FIG. 8 is a schematic view of a quench protection circuit of a superconducting magnet system provided by the fifth embodiment of the disclosure.

Please further refer to FIG. 7, the voltage of the thermal shield 105 is taken from the coil subsets L3 to L6 and the voltage of the vacuum vessel 107 is taken from the coil subsets L2 to L7, which is just an example. Depending on the needs of the design, their voltage can be taken from the voltage at both ends of any symmetrical coil, and even one or more symmetrically arranged coils can be divided into several symmetrical sub-coils, and their voltage can be taken from the voltage at both ends of any symmetrical coil including the sub-coil. It is even possible to switch these two branches and then connect them into the circuit, as shown in FIG. 8. However, their voltage cannot be taken from the voltage between the low-temperature superconducting switches 103.

Those skilled in the art can easily understand that the above are only preferred embodiments of the disclosure and are not intended to limit the disclosure. Any modification, equivalent replacement and improvement, etc., made within the spirit and principle of the disclosure should fall within the scope to be protected by the disclosure.

What is claimed is:

1. A quench protection circuit, comprising: a superconducting unit, a first diode integrated element, a low-temperature superconducting switch and a thermal shield;
    wherein the superconducting unit is composed of M superconducting coils connected in series, wherein M is an integer number greater than 1;
    a non-serial connection end of a first superconducting coil of the M superconducting coils and a non-serial connection end of an M-th superconducting coil of the M superconducting coils are respectively connected to current leads, and the current leads are connected to an excitation power supply;
    one end of the low-temperature superconducting switch is connected to the non-serial connection end of the first superconducting coil, and the other end of the low-temperature superconducting switch is connected to the non-serial connection end of the M-th superconducting coil;
    the first diode integrated element is connected in parallel with the low-temperature superconducting switch to protect the low-temperature superconducting switch;
    the thermal shield is connected in parallel to both ends of any superconducting coil subset that are spatially symmetric in the superconducting unit, the thermal shield is configured to transfer a magnetic energy in a superconducting coil during a quench process;
    the superconducting coil subset is composed of one superconducting coil or a plurality of superconducting coils, or composed of one superconducting sub-coil or composed of the one superconducting sub-coil and the one superconducting coil, wherein the one superconducting sub-coil is a part of the one superconducting coil.

2. The quench protection circuit according to claim 1, wherein one end of the thermal shield is connected to a connection end where a second superconducting coil of the M superconducting coils is connected to a third superconducting coil of the M superconducting coils, and the other end of the thermal shield is connected to a connection end where an (M−2)th superconducting coil of the M superconducting coils is connected to an (M−1)th superconducting coil of the M superconducting coils.

3. The quench protection circuit according to claim 2, wherein the quench protection circuit further comprises a vacuum vessel, which is connected in parallel with the thermal shield, the vacuum vessel is configured to further transfer the magnetic energy of the superconducting magnet during the quench process.

4. The quench protection circuit according to claim 2, wherein the quench protection circuit further comprises a vacuum vessel and a third diode integrated element,
    the vacuum vessel and the third diode integrated element are connected in series and connected to the both ends of any of the coil subsets that are spatially symmetrical in the superconducting unit.

5. The quench protection circuit according to claim 1, wherein one end of the thermal shield is connected to a connection end where the first superconducting coil of the M superconducting coils is connected to a second superconducting coil of the M superconducting coils, and the other end of the thermal shield is connected to a connection end where an (M−1)th superconducting coil of the M superconducting coils is connected to the M-th superconducting coil of the M superconducting coils.

6. The quench protection circuit according to claim 5, wherein the quench protection circuit further comprises a vacuum vessel, which is connected in parallel with the thermal shield, the vacuum vessel is configured to further transfer the magnetic energy of the superconducting magnet during the quench process.

7. The quench protection circuit according to claim 5, wherein the quench protection circuit further comprises a vacuum vessel and a third diode integrated element,
    the vacuum vessel and the third diode integrated element are connected in series and connected to the both ends of any of the coil subsets that are spatially symmetrical in the superconducting unit.

8. The quench protection circuit according to claim 1, wherein one end of the thermal shield is connected to a first position, and the other end is connected to a second position, the first position is set at any position in any one of the superconducting coils, and the second position is set at a position that is spatially symmetrical to the first position.

9. The quench protection circuit according to claim 8, wherein the quench protection circuit further comprises a vacuum vessel, which is connected in parallel with the thermal shield, the vacuum vessel is configured to further transfer the magnetic energy of the superconducting magnet during the quench process.

10. The quench protection circuit according to claim 8, wherein the quench protection circuit further comprises a vacuum vessel and a third diode integrated element,
    the vacuum vessel and the third diode integrated element are connected in series and connected to the both ends of any of the coil subsets that are spatially symmetrical in the superconducting unit.

11. The quench protection circuit according to claim 1, wherein the quench protection circuit further comprises a second diode integrated element, which is connected in series with the thermal shield, and is configured to, when a superconducting magnet is in a ramp-up or a ramp-down mode, prevent the thermal shield from conducting electricity and prevent the thermal shield from being heated and resulting in increased radiant heat and even quenching of the superconducting magnet.

12. The quench protection circuit according to claim 11, wherein a threshold voltage of the second diode integrated element is greater than a maximum voltage at both ends of the coil subset connected in parallel with the second diode integrated element in the ramp-up or the ramp-down mode.

13. The quench protection circuit according to claim 12, wherein the quench protection circuit further comprises a vacuum vessel, which is connected in parallel with the thermal shield, the vacuum vessel is configured to further transfer the magnetic energy of the superconducting magnet during the quench process.

14. The quench protection circuit according to claim 11, wherein the quench protection circuit further comprises a vacuum vessel, which is connected in parallel with the thermal shield, the vacuum vessel is configured to further transfer the magnetic energy of the superconducting magnet during the quench process.

15. The quench protection circuit according to claim 11, wherein the quench protection circuit further comprises a vacuum vessel and a third diode integrated element,
the vacuum vessel and the third diode integrated element are connected in series and connected to the both ends of any of the coil subsets that are spatially symmetrical in the superconducting unit.

16. The quench protection circuit according to claim 1, wherein the quench protection circuit further comprises a vacuum vessel, which is connected in parallel with the thermal shield, the vacuum vessel is configured to further transfer the magnetic energy of the superconducting magnet during the quench process.

17. The quench protection circuit according to claim 1, wherein the quench protection circuit further comprises a vacuum vessel and a third diode integrated element, the vacuum vessel and the third diode integrated element are connected in series and connected to the both ends of any of the coil subsets that are spatially symmetrical in the superconducting unit.

18. The quench protection circuit according to claim 17, wherein the vacuum vessel and the third diode integrated element are connected in series and connected between a connection end of the first superconducting coil and a second superconducting coil of the M superconducting coils and a connection end of an (M−1)th superconducting coil of the M superconducting coils and the M-th superconducting coil.

19. The quench protection circuit according to claim 17, wherein the vacuum vessel and the third diode integrated element are connected in series and connected between a connection end of a second superconducting coil of the M superconducting coils and a third superconducting coil of the M superconducting coils and a connection end of an (M−2)th superconducting coil of the M superconducting coils and an (M−1)th superconducting coil of the M superconducting coils.

20. A superconducting magnet system, comprising a quench protection circuit, wherein the quench protection circuit is the quench protection circuit claimed in claim 1.

* * * * *